(12) United States Patent
Jeong et al.

(10) Patent No.: US 11,876,469 B2
(45) Date of Patent: Jan. 16, 2024

(54) SINGLE MOTOR WITH DUAL INVERTERS USING VOLTAGE VECTOR

(71) Applicants: Hyundai Motor Company, Seoul (KR); Kia Corporation, Seoul (KR); Seoul National University R&DB Foundation, Seoul (KR)

(72) Inventors: Kang Ho Jeong, Hwaseong-si (KR); Sang Cheol Shin, Suwon-si (KR); Jung Ik Ha, Seoul (KR); Hyeon Gyu Choi, Seongnam-si (KR); Jae Hoon Sim, Seoul (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/846,655

(22) Filed: Jun. 22, 2022

(65) Prior Publication Data

US 2023/0029229 A1  Jan. 26, 2023

(30) Foreign Application Priority Data

Jul. 20, 2021 (KR) .......................... 10-2021-0095068

(51) Int. Cl.
*H02K 33/00* (2006.01)
*H02P 1/00* (2006.01)
(Continued)

(52) U.S. Cl.
CPC .............. *H02P 27/08* (2013.01); *H02P 21/22* (2016.02)

(58) Field of Classification Search
CPC ................................ H02P 27/08; H02P 21/22
(Continued)

(56) References Cited

U.S. PATENT DOCUMENTS

2009/0033253 A1  2/2009  Nagashima et al.
2016/0352278 A1* 12/2016  Jiang ..................... H02M 7/493
(Continued)

FOREIGN PATENT DOCUMENTS

EP  3 255 783 A1  12/2017
JP  6285256 B2  2/2018
(Continued)

OTHER PUBLICATIONS

Markus Neubert et al: "Performance comparison of inverter and drive configurations with open-end and star-connected windings", 2014 International Power Electronics Conference (IPEC—Hiroshima 2014, ECCE Asia), May 21, 2014.
(Continued)

*Primary Examiner* — Erick D Glass
(74) *Attorney, Agent, or Firm* — Morgan, Lewis & Bockius LLP

(57) ABSTRACT

A motor driving apparatus which drives a motor including a plurality of windings corresponding to a plurality of phases, respectively, includes: a first inverter including a plurality of first switching elements and connected to a first end of each of the windings; a second inverter including a plurality of second switching elements and connected to a second end of each of the windings; and a controller obtaining a vector corresponding to a voltage command of the motor by combining switching vectors which cause difference between a common mode voltage of the first inverter and a common mode voltage of the second inverter to be zero and configured to control the plurality of first switching elements and the plurality of second switching elements in a pulse width modulation method based on the obtained vector.

4 Claims, 6 Drawing Sheets

(51) Int. Cl.
    *H02P 3/00*         (2006.01)
    *H02P 5/00*         (2016.01)
    *H02P 27/08*       (2006.01)
    *H02P 21/22*       (2016.01)

(58) Field of Classification Search
    USPC .......................................................... 318/132
    See application file for complete search history.

(56) References Cited

U.S. PATENT DOCUMENTS

| | | | |
|---|---|---|---|
| 2018/0026567 A1* | 1/2018 | El Khamlichi Drissi | B60L 50/51 318/139 |
| 2018/0152127 A1 | 5/2018 | Park et al. | |
| 2020/0177102 A1* | 6/2020 | Mori | H02M 7/53871 |

FOREIGN PATENT DOCUMENTS

| JP | 2019-047670 A | 3/2019 |
|---|---|---|
| JP | 6773365 B2 | 10/2020 |
| KR | 10-1956991 B1 | 3/2019 |

OTHER PUBLICATIONS

Extended European Search Report dated Nov. 23, 2022, issued in corresponding European Patent Application No. 22183032.6.

* cited by examiner

SINGLE MOTOR WITH DUAL INVERTERS USING VOLTAGE VECTOR

CROSS REFERENCE TO RELATED APPLICATION

The present application claims priority to Korean Patent Application No. 10-2021-0095068, filed Jul. 20, 2021, the entire contents of which is incorporated herein for all purposes by this reference.

BACKGROUND OF THE PRESENT DISCLOSURE

Field of the Present Disclosure

The present disclosure relates to a motor driving apparatus. More particularly, the present disclosure relates to a motor driving apparatus using an open end winding method in which inverters are connected to the opposite ends of the winding of a motor, respectively.

Description of Related Art

Generally, the winding of each phase included in a motor has a first end connected to one inverter and a second end connected to each other to form a Y connection.

During the driving of the motor, while a switching element in the inverter is turned ON/OFF by pulse width modulation control, a line voltage is applied to the winding of the motor in which the Y connection is formed to generate an alternating current to generate torque.

The fuel efficiency of eco-friendly vehicles such as electric vehicles that use torque generated by the present motor as power is determined by the power conversion efficiency of an inverter-motor, so it is important to maximize the power conversion efficiency of the inverter and the efficiency of the motor to improve fuel efficiency.

The efficiency of the inverter-motor system is mainly determined by the voltage utilization rate of an inverter, and when the operating point of a vehicle determined by a relationship between a motor speed and a torque is formed in a section in which the voltage utilization rate is high, the fuel efficiency of the vehicle may be improved.

However, as the number of the windings of a motor is increased to increase the maximum torque of the motor, a section having a high voltage utilization rate becomes farther from a low torque area, which is the main operating point of a vehicle, and thus the fuel efficiency of the vehicle may deteriorate. Additionally, in terms of fuel efficiency, when the main operating point is designed to be included in the section having a high voltage utilization rate, there is a limit to the maximum torque of the motor, which may deteriorate the launch acceleration performance of the vehicle.

To solve these problems, in the related technical field, the motor driving technique of an open end winding (OEW) method is provided, in which two inverters are driven by connecting the inverters to the opposite ends, respectively, of the winding of the motor instead of short-circuiting an end of the winding of the motor through a Y connection.

Such a motor driving technique using the open end winding method has the advantage that the technique can improve voltage utilization rate and realize high output by increasing a phase voltage compared to the method of driving the conventional motor having a Y-connection structure.

However, in the motor driving technique of the open end winding method, due to common mode voltage difference between inverters connected to the opposite ends of the winding of the motor, respectively, circulating current may be generated. The present circulating current causes losses such as copper loss and iron loss while the circulating current flows through the winding of the motor, lowering motor efficiency.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus in which during the driving of the motor using an open end winding method in which inverters are connected to the opposite ends of the winding of a motor, respectively, circulating current generated by common mode voltage difference between the two inverters is removed to improve the efficiency of the motor.

In various aspects of the present disclosure, there is provided a motor driving apparatus configured to drive a motor including a plurality of windings respectively corresponding to a plurality of phases, the apparatus including: a first inverter including a plurality of first switching elements and connected to a first end of each of the windings; a second inverter including a plurality of second switching elements and connected to a second end of each of the windings; and a controller configured to obtain a voltage command vector, which is a vector corresponding to a voltage command of the motor, by combining switching vectors which cause difference between a common mode voltage of the first inverter and a common mode voltage of the second inverter to be zero and configured to control the plurality of first switching elements and the plurality of second switching elements in a pulse width modulation method based on the obtained voltage command vector.

In the exemplary embodiment of the present disclosure, when obtaining the voltage command vector, the controller may not use a switching vector in which a switching state of the first inverter is [100] and a switching state of the second inverter is [011], a switching vector in which the switching state of the first inverter is [110] and the switching state of the second inverter is [001], a switching vector in which the switching state of the first inverter is [010] and the switching state of the second inverter is [101], a switching vector in which the switching state of the first inverter is [001] and the switching state of the second inverter is [100], and a switching vector in which the switching state of the first inverter is [001] and the switching state of the second inverter is [100].

In the exemplary embodiment of the present disclosure, the switching vectors which cause the common mode voltage difference to be zero may include: a switching vector in which a switching state of the first inverter is [100] and a switching state of the second inverter is [010]; a switching vector in which the switching state of the first inverter is [100] and the switching state of the second inverter is [001]; a switching vector in which the switching state of the first inverter is [110] and the switching state of the second inverter is [011]; a switching vector in which the switching state of the first inverter is [110] and the switching state of the second inverter is [101]; a switching vector in which the switching state of the first inverter is [010] and the switching state of the second inverter is [001]; a switching vector in which the switching state of the first inverter is [010] and the switching state of the second inverter is [100]; a switching vector in which the switching state of the first inverter is [011] and the switching state of the second inverter is [101]; a switching vector in which the switching state of the first inverter is [011] and the switching state of the second inverter is [110]; a switching vector in which the switching state of the first inverter is [001] and the switching state of the second inverter is [100]; a switching vector in which the switching state of the first inverter is [001] and the switching state of the second inverter is [010]; a switching vector in which the switching state of the first inverter is [101] and the switching state of the second inverter is [110]; and a switching vector in which the switching state of the first inverter is [101] and the switching state of the second inverter is [011].

Here, first, second, third digits of numbers indicating the switching states may indicate the switching states of the switching elements in phases a, b, and c, respectively, in each of the first inverter and the second inverter, and a number "1" may indicate that an upper switching element of an associated phase is turned on and a lower switching element thereof is turned off, and a number "0" may indicate that the upper switching element of the associated phase is turned off and the lower switching element thereof is turned on.

In the exemplary embodiment of the present disclosure, the controller may obtain the voltage command vector by combining two switching vectors adjacent to the voltage command vector of the motor among the switching vectors which cause the common mode voltage difference to be zero.

In the exemplary embodiment of the present disclosure, the controller may express the voltage command vector as a sum of values obtained by the two switching vectors adjacent to the voltage command vector of the motor multiplied by predetermined coefficients, respectively, and may determine a duty of space vector pulse width modulation based on the coefficients.

According to the motor driving apparatus, the common mode voltage difference between two inverters applied in an open end winding method is removed, preventing the generation of circulating current between the two inverters. Accordingly, the distortion of a motor phase current due to the circulating current is prevented, facilitating the control of the motor current, and losses such as the iron and copper losses of the motor caused by the circulating current are prevented, significantly improving the driving efficiency of the motor.

Effects obtainable in an exemplary embodiment of the present disclosure are not limited to the above-mentioned effects, and other effects not mentioned will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
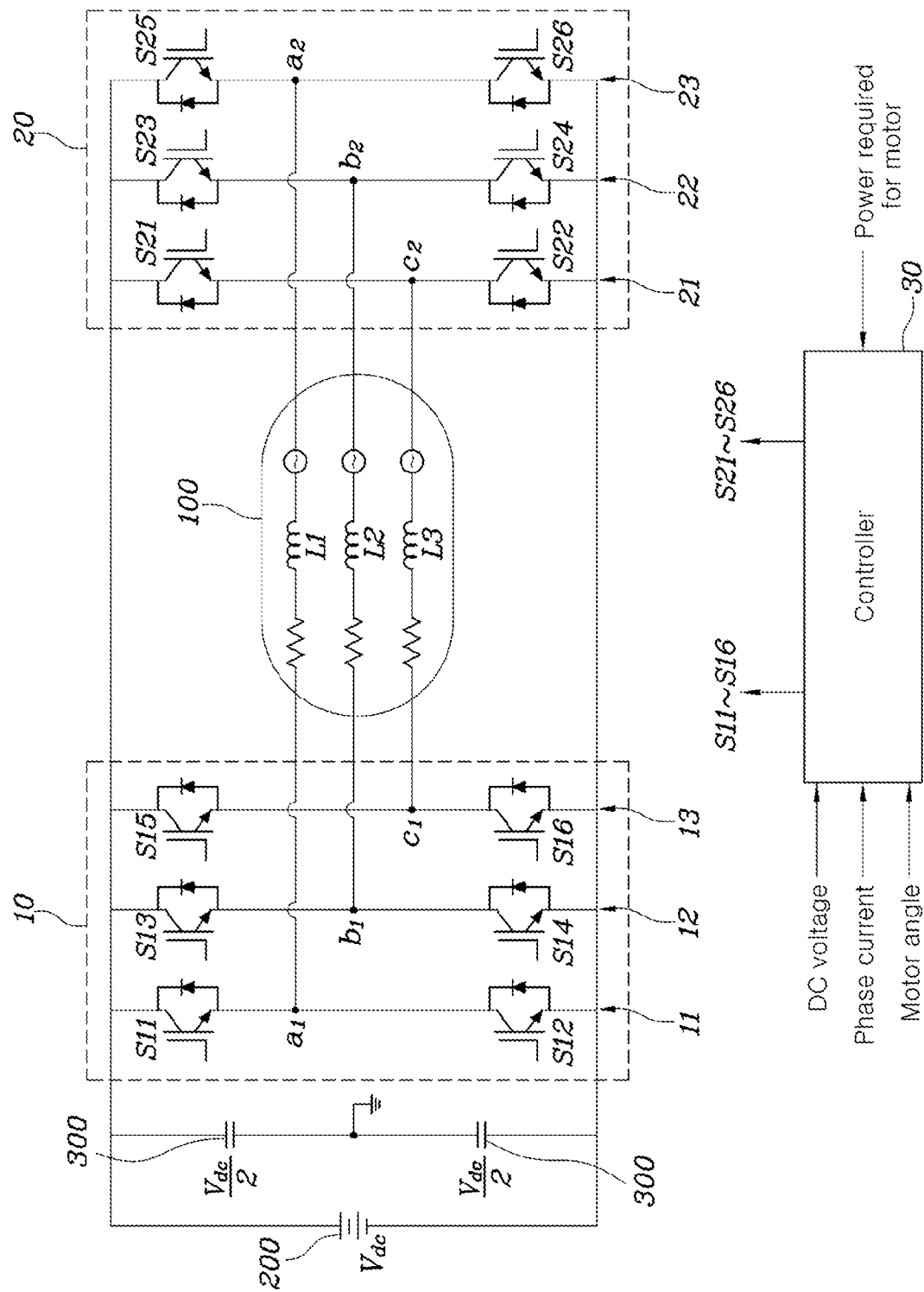
FIG. 1 is the circuit diagram of a motor driving apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving apparatus according to the exemplary embodiment of the present disclosure will be described in detail with reference to the accompanying drawings.

FIG. 1 is the circuit diagram of the motor driving apparatus according to the exemplary embodiment of the present disclosure.

Referring to FIG. 1, the motor driving apparatus according to the exemplary embodiment of the present disclosure is a motor driving apparatus configured to supply driving power to a motor 100 including a plurality of windings L1 to L3 corresponding to a plurality of phases, respectively, and may include a first inverter 10 including a plurality of first switching elements S11 to S16 and connected to the first end of each of the windings of the motor 100, a second inverter 20 including a plurality of second switching elements S21 to S26 and connected to the second end of each of the windings of the motor 100, and a controller 30 performing the pulse width modulation control of the first switching elements S11 to S16 and the second switching elements S21 to S26 based on power required for the motor 100.

The first inverter 10 and the second inverter 20 may convert DC power stored in a battery 200 into three-phase AC power to provide the three-phase AC power to the motor 100, or may convert regenerative braking energy generated by regenerative braking torque of the motor 100 occurring during regenerative braking into DC power to provide the DC power to the battery 200. The present conversion between DC power and AC power may be performed by the pulse width modulation control of the plurality of first switching elements S11-S16 and the plurality of second switching elements S21 to S26 provided in the first inverter 10 and the second inverter 20, respectively.

The first inverter 10 may include a plurality of legs 11 to 13 to which a DC voltage formed in a DC capacitor 300 connected between the opposite ends of the battery 200 is applied. The legs 11 to 13 correspond to the plurality of phases of the motor 100, respectively, to perform electrical connection therebetween.

A first leg 11 includes two switching elements S11 and S12 connected in series to each other between the opposite ends of the DC capacitor 300, and the connection node of the two switching elements S11 and S12 may be connected to the first end of the winding L1 of one phase in the motor 100 so that AC power corresponding to the one phase of the plurality of phases is input/output.

Likewise, a second leg 12 includes two switching elements S13 and S14 connected in series to each other between the opposite ends of the DC capacitor 300, and the connection node of the two switching elements S13 and S14 may be connected to the first end of the winding L2 of one phase in the motor 100 so that AC power corresponding to the one phase of the plurality of phases is input/output.

Furthermore, a third leg 13 includes two switching elements S15 and S16 connected in series to each other between the opposite ends of the DC capacitor 300, and the connection node of the two switching elements S15 and S16 may be connected to the first end of the winding L3 of one phase in the motor 100 so that AC power corresponding to the one phase of the plurality of phases is input/output.

The second inverter 20 may also have configuration similar to the configuration of the first inverter 10. The second inverter 20 may include a plurality of legs 21 to 23 to which the DC voltage formed in the DC capacitor 300 connected between the opposite ends of the battery 200 is applied. The legs 21 to 23 correspond to the plurality of phases of the motor 100, respectively, to perform electrical connection therebetween.

A first leg 21 includes two switching elements S21 and S22 connected in series to each other between the opposite ends of the DC capacitor 300, and the connection node of the two switching elements S21 and S22 may be connected to the second end of the winding L3 of one phase in the motor 100 so that AC power corresponding to one phase of the plurality of phases is input/output.

Likewise, a second leg 22 includes two switching elements S23 and S24 connected in series to each other between the opposite ends of the DC capacitor 300, and the connection node of the two switching elements S23 and S24 may be connected to the second end of the winding L2 of one phase in the motor 100 so that AC power corresponding to the one phase of a plurality of phases is input/output.

Furthermore, a third leg 23 includes two switching elements S25 and S26 connected in series to each other between the opposite ends of the DC capacitor 300, and the connection node of the two switching elements S25 and S26 may be connected to the second end of the winding L1 of one phase in the motor 100 so that AC power corresponding to the one phase of the plurality of phases is input/output.

The first inverter 10 is connected to the first end of each of the windings L1 to L3 of the motor 100, and the second inverter 20 is connected to the second end of each of the windings L1 to L3 of the motor 100. That is, electrical connection between the inverters and the motor may be performed in an open end winding method in which the opposite ends of each of the windings L1 to L3 of the motor 100 are connected to the first inverter 10 and the second inverter 20, respectively.

The controller 30 is a component configured to perform the pulse width modulation control of the switching elements S11 to S16 and S21 to S26 included in the first inverter 10 and the second inverter 20, respectively, based on power required for the motor 100 so that the motor 100 may be driven.

The controller 30 receives the DC voltage Vdc applied to the first inverter 10 and the second inverter 20, a phase current detected by a current detector and supplied to the motor 100, and the electric angle of the motor detected by a motor rotor detector mounted to the motor 100 to switch the first switching elements S11 to S16 of the first inverter 10 and the second switching elements S21 to S26 of the second inverter 20 in a pulse width modulation method so that the motor 100 may be driven. When controlling the first switching elements S11 to S16 of the first inverter 10 and the second switching elements S21 to S26 of the second inverter 20 in the pulse width modulation method, the controller 30 may apply a space vector pulse width modulation (SVPWM) method.

Figure 2:
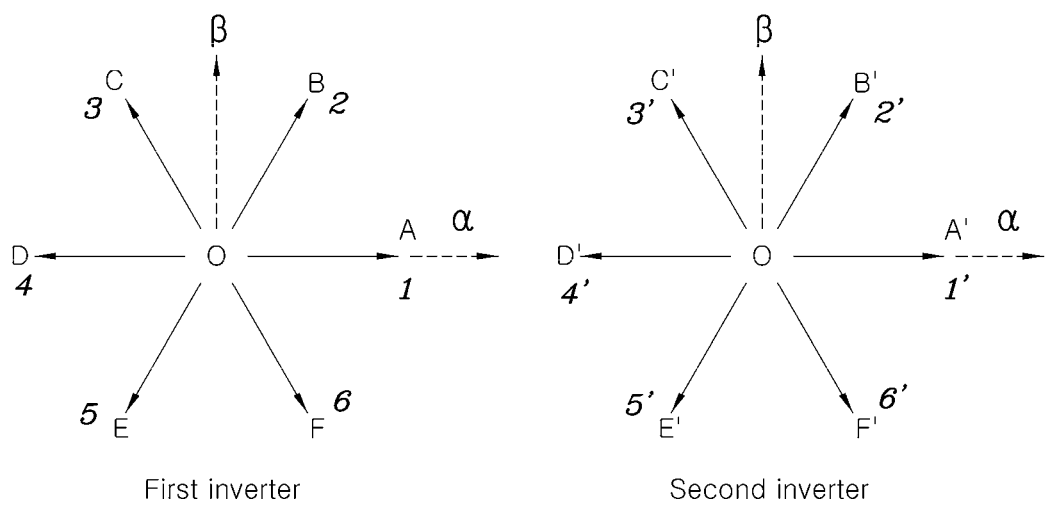
FIG. 2 is a diagram illustrating the voltage vector of each of two inverters when controlling an open end winding motor by use of a space vector pulse width modulation method.
Figure 3:
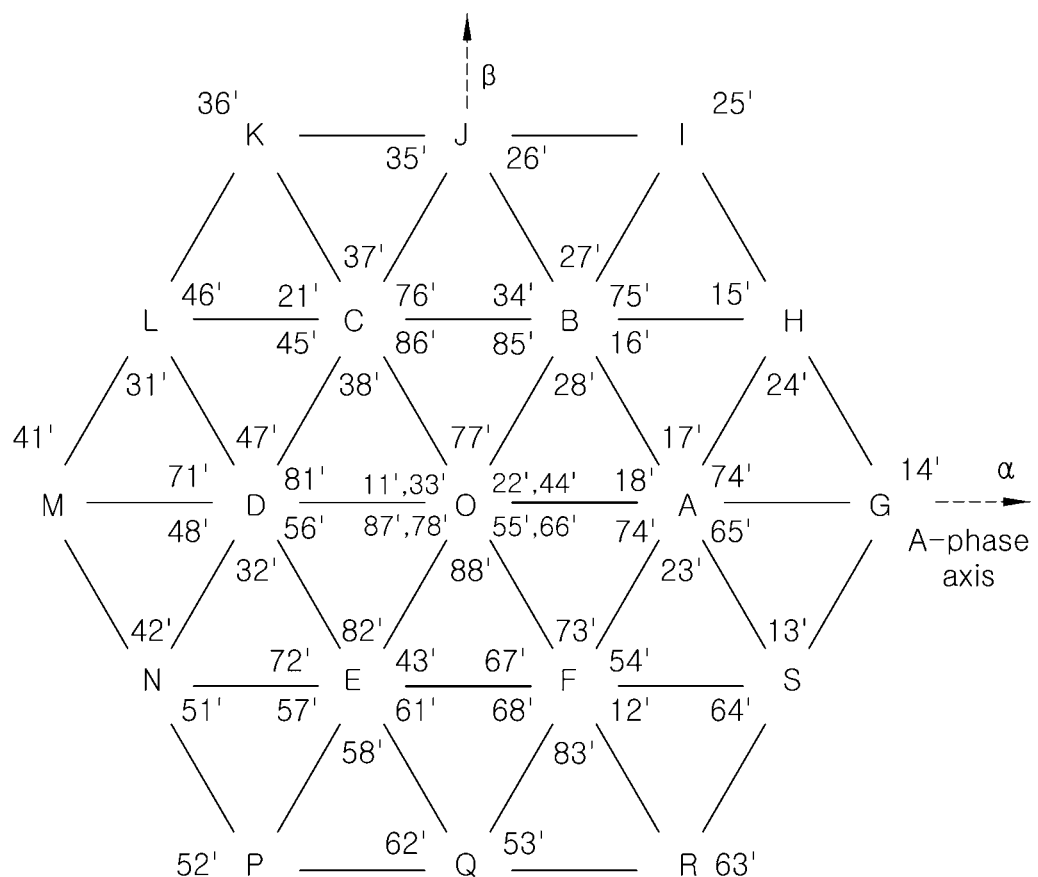
FIG. 3 is a diagram illustrating voltage vectors combined by the two inverters during the driving of the motor in an open end winding method.

FIG. 2 is a view exemplarily illustrating the voltage vector of each of two inverters when controlling an open end winding motor by use of the space vector pulse width modulation method, and FIG. 3 is a view exemplarily illustrating voltage vectors combined by the two inverters during the driving of the motor in the open end winding method.

In a circuit structure illustrated in FIG. 1, each of the first inverter 10 and the second inverter 20 includes a pair of switching elements (a pair of S11 and S12, a pair of S13 and S14, a pair of S15 and S16, a pair of S21 and S22, a pair of S23 and S24, a pair of S25 and S26 in a leg corresponding to each phase of the motor, and the switching elements in each leg can operate complementarily to each other. In each leg, a switching element connected to the high-potential end of the DC voltage Vdc is referred to as an upper switching element, and a switching element connected to the low-potential end of the DC voltage Vdc is referred to as a lower switching element.

In a vector diagram illustrated in FIG. 2, the vertices and starting point of a hexagon represent voltage vectors according to the states of the switching elements of each inverter. For example, a point indicated by an index A represents the voltage vector [100] of the first inverter 10. Here, [100] indicates that the upper switching element S11 of the switching elements S11 and S12 included in a leg corresponding to the phase one of the first inverter 10 is turned on and the lower switching element S12 is turned off, and the upper switching elements S13 and S15 of switching elements included in legs corresponding to the remaining phases are turned off and the lower switching elements S14 and S16 are turned on.

Furthermore, the center portion of the hexagon corresponds to the vector [000] or [111], which indicates that all the upper switching elements of the legs of an inverter are turned off or on.

As illustrated in FIG. 2, voltage vectors which may be combined by each inverter may include a total of eight voltage vectors according to the combination of the ON/OFF states of six switching elements.

When driving a normal Y-connection motor, as illustrated in FIG. 2, a voltage vector corresponding to a voltage command is obtained by use of a hexagon corresponding to one inverter so that the pulse width modulation control of switching elements may be performed. That is, when the voltage command is obtained by the sum of reference vectors indicating switching states (vectors corresponding to indices A to F or A' to F' in FIG. 2), the ratio of coefficients by which the reference vectors are multiplied may be expressed as a duty ratio. For example, when a voltage command corresponds to a vector obtained by summing a vector corresponding to the index A and a vector corresponding to the index B multiplied by 0.2 and 0.5, respectively, the switching elements of an inverter may be controlled so that the state of [100] and the state of [110] show a ratio of 2:5 during a voltage modulation period.

When the motor 100 is driven in the open end winding method, each leg of the first inverter 10 and the second inverter 20 is configured to be connected to the opposite ends of a motor coil corresponding to each phase of the motor 100, so that the phase voltage of each phase is applied to the motor due to phase voltage difference between the first inverter and the second inverter. Additionally, the first inverter 10 and the second inverter 20 are controlled independently of each other, so voltage vectors applied actually to the motor may include a total of 64 voltage vectors by combining eight voltage vectors which may be combined by the first inverter 10 and eight voltage vectors which may be combined by the second inverter 20 as illustrated in FIG. 3.

In the vector diagram of FIG. 3, the anterior number of numbers marked at a point at which each line meets corresponds to the switching state of the voltage vector diagram of the first inverter as illustrated in FIG. 2, and the posterior number of the numbers including a single quotation mark corresponds to the switching state of the voltage vector diagram of the second inverter as illustrated in FIG. 2. However, in the vector diagram of FIG. 3, the state of [000] in which all upper switching elements are turned off is indicated by a number "8".

For example, in FIG. 3, a point corresponding to an index B may be expressed as the combination of a total of six switching states. 28' corresponding to the index B means that 28' corresponds to the combination of the vector [110] of the first inverter and the vector [000] of the second inverter. Furthermore, 16' means that 16' corresponds to the combination of the vector [100] of the first inverter and the vector [101] of the second inverter. A motor voltage is indicated by difference between the voltage of the first inverter and the voltage of the second inverter, so at a position corresponding to the vector [100] of the first inverter, a point corresponding to the reverse direction of the vector [101] of the second inverter becomes a point corresponding to the index B. As described above, the remaining numbers may also be understood to indicate each point as the combination of the vectors of the switching states of the first inverter and the vectors of the switching states of the second inverter.

Meanwhile, the common mode voltage of each of the inverters 10 and 20, which has value defined as the average of the pole voltages of each phase, has value corresponding to the average value of inverter output voltages including a plurality of phases. In the case of a three-phase motor, value obtained by dividing the sum of the pole voltages of each phase by 3 may be a common mode voltage. When driving the motor in the open end winding method, the average value of the output voltages of two inverters is zero for each phase to be balanced. That the average value of the output voltages of the two inverters is zero means that the sum of the currents of the motor is zero, which may be achieved by causing common mode voltage difference between the two inverters to be zero.

Accordingly, to obtain a voltage command vector during the driving of the motor in the open end winding method, reference voltage vectors which cause common mode voltage difference between two inverters to be a value except for zero are not used.

In FIG. 3, voltage vectors indicated by reference numerals "51" to "56" have common mode voltage difference between two inverters which is not zero.

For example, in FIG. 3, in OS vector (13' vector), the switching state of the first inverter is [100] and the switching state of the second inverter is [010], and accordingly, the common mode voltage of the first inverter can be determined as "$\{(Vdc/2)+0+0\}/3=Vdc/6$", and the common mode voltage of the second inverter can be determined as "$\{0+(Vdc/2)+0\}/3=Vdc/6$". Accordingly, difference between the two common-mode voltages is zero.

On the other hand, in FIG. 3, in OG vector (14' vector), the switching state of the first inverter is [100] and the switching state of the second inverter is [011], and accordingly, the common mode voltage of the first inverter can be determined as "$\{(Vdc/2)+0+0\}/3=Vdc/6$", and the common mode voltage of the second inverter can be determined as "$\{0+(Vdc/2)+(Vdc/2)\}/3=Vdc/3$". Accordingly, difference between the two common-mode voltages is "$-Vdc/6$".

Here, Vdc may be an inverter DC input voltage, that is, the voltage of the battery 200.

It may be checked that when determining common mode voltage difference between two inverters in the same way as the above example, voltage vectors indicated by reference numerals "51" to "56" in FIG. 3 have common mode voltage difference between two inverters which is not 0.

Switching vectors which cause difference between the common mode voltage of the first inverter and the common mode voltage of the second inverter to be a value except for zero are a switching vector in which the switching state of the first inverter is [100] and the switching state of the second inverter is [011], a switching vector in which in which the switching state of the first inverter is [110] and the switching state of the second inverter [001], a switching vector in which the switching state of the first inverter is [010] and the switching state of the second inverter is [101], a switching vector in which the switching state of the first inverter is [001] and the switching state of the second inverter is [100], and a switching vector in which the switching state of the first inverter is [001] and the switching state of the second inverter is [110].

Figure 4:
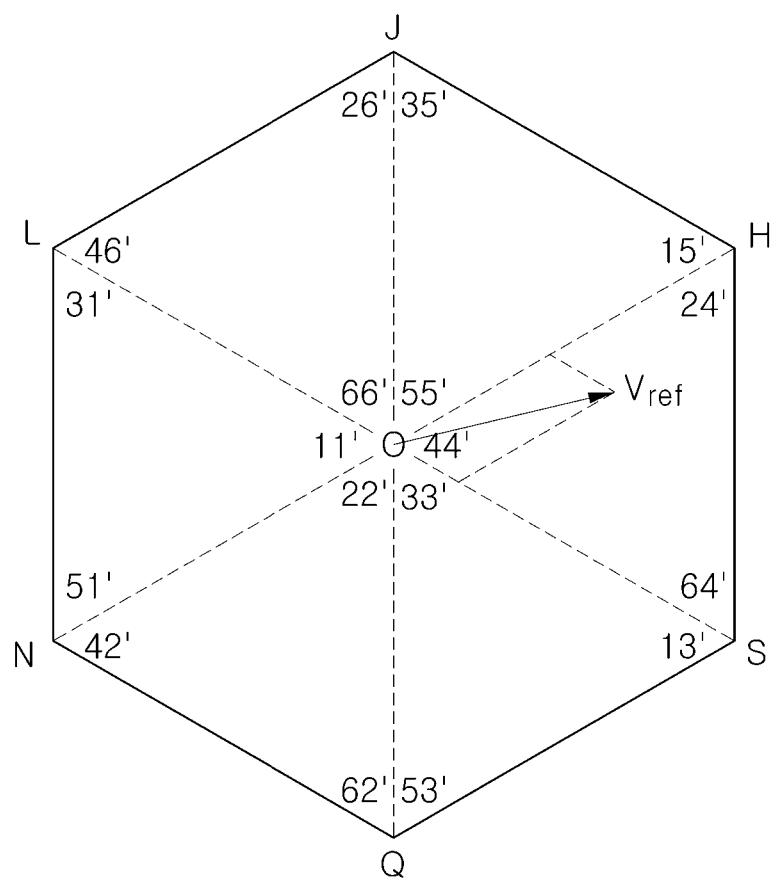
FIG. 4 is a simplified vector diagram illustrated by excluding voltage vectors which cause common mode voltage difference between the two inverters in the vector diagram illustrated in FIG. 3.

FIG. 4 is a simplified vector diagram illustrated by excluding voltage vectors which cause common mode voltage difference between the two inverters in the vector diagram illustrated in FIG. 3.

As illustrated in FIG. 4, except for the voltage vectors which cause the common mode voltage difference between the two inverters, outermost voltage vectors which do not cause the common mode voltage difference between the two inverters are connected to each other to form the shape of a hexagon.

Vectors which do not cause common mode voltage difference between two inverters, that is, switching vectors which cause common mode voltage difference to be zero may be a switching vector in which the switching state of the first inverter is [100] and the switching state of the second inverter is [010], a switching vector in which the switching state of the first inverter is [100] and the switching state of the second inverter is [100], a switching vector in which the switching state of the first inverter is [110] and the switching state of the second inverter is [011], a switching vector in which the switching state of the first inverter is [110] and the switching state of the second inverter is [101], a switching vector in which the switching state of the first inverter is [010] and the switching state of the second inverter is [001], a switching vector in which the switching state of the first inverter is [010] and the switching state of the second inverter is [100], a switching vector in which the switching state of the first inverter is [011] and the switching state of the second inverter is [101], a switching vector in which the switching state of the first inverter is [011] and the switching state of the second inverter is [110], a switching vector in which the switching state of the first inverter is [001] and the switching state of the second inverter is [100], a switching vector in which the switching state of the first inverter is [001] and the switching state of the second inverter is [010], a switching vector in which the switching state of the first inverter is [101] and the switching state of the second inverter is [110], and a switching vector in which the switching state of the first inverter is [101] and the switching state of the second inverter is [011].

The controller 30 may obtain a vector corresponding to a voltage command by combining two vectors of switching vectors which cause the common mode voltage difference to be zero.

For example, when the voltage command vector Vref is shown on a vector diagram as illustrated in FIG. 4, the controller 30 may obtain the voltage command vector by combining two switching vectors adjacent to the voltage command vector Vref among the switching vectors which cause the common mode voltage difference to be zero as described above. That is, the controller 30 may express the voltage command vector as the sum of values obtained by the two switching vectors multiplied by predetermined coefficients, respectively, and the ratio of the coefficients by which the two switching vectors are multiplied may be expressed as the duty ratio of each switching state during the space vector pulse width modulation.

Figure 5:
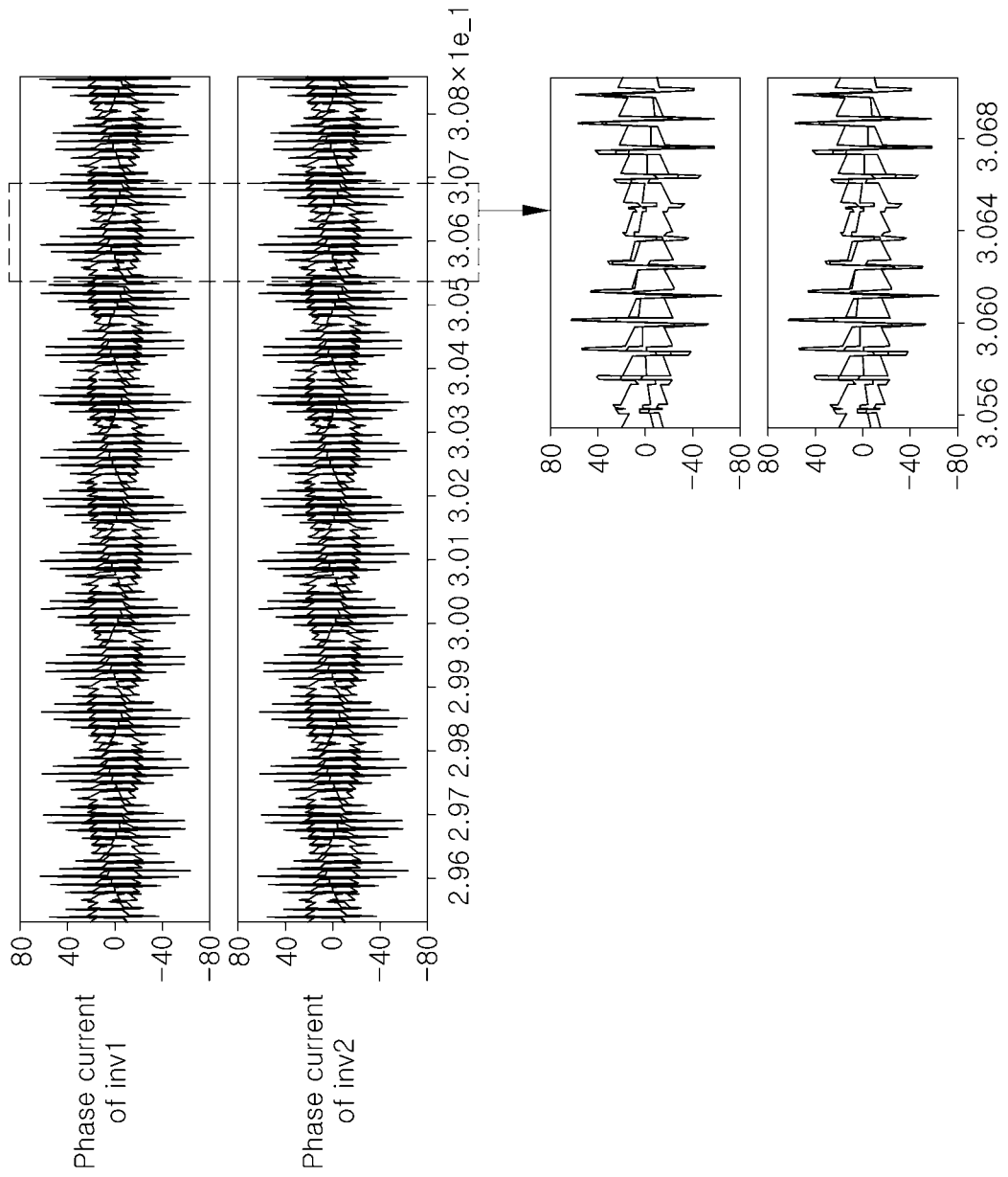
FIG. 5 and FIG. 6 are graphs illustrating an inverter phase current in the case of performing the space vector pulse width modulation by use of switching vectors having common mode voltage difference and an inverter phase current in the case of performing the space vector pulse width modulation by use of switching vectors from which the common mode voltage difference is removed, respectively.
Figure 6:
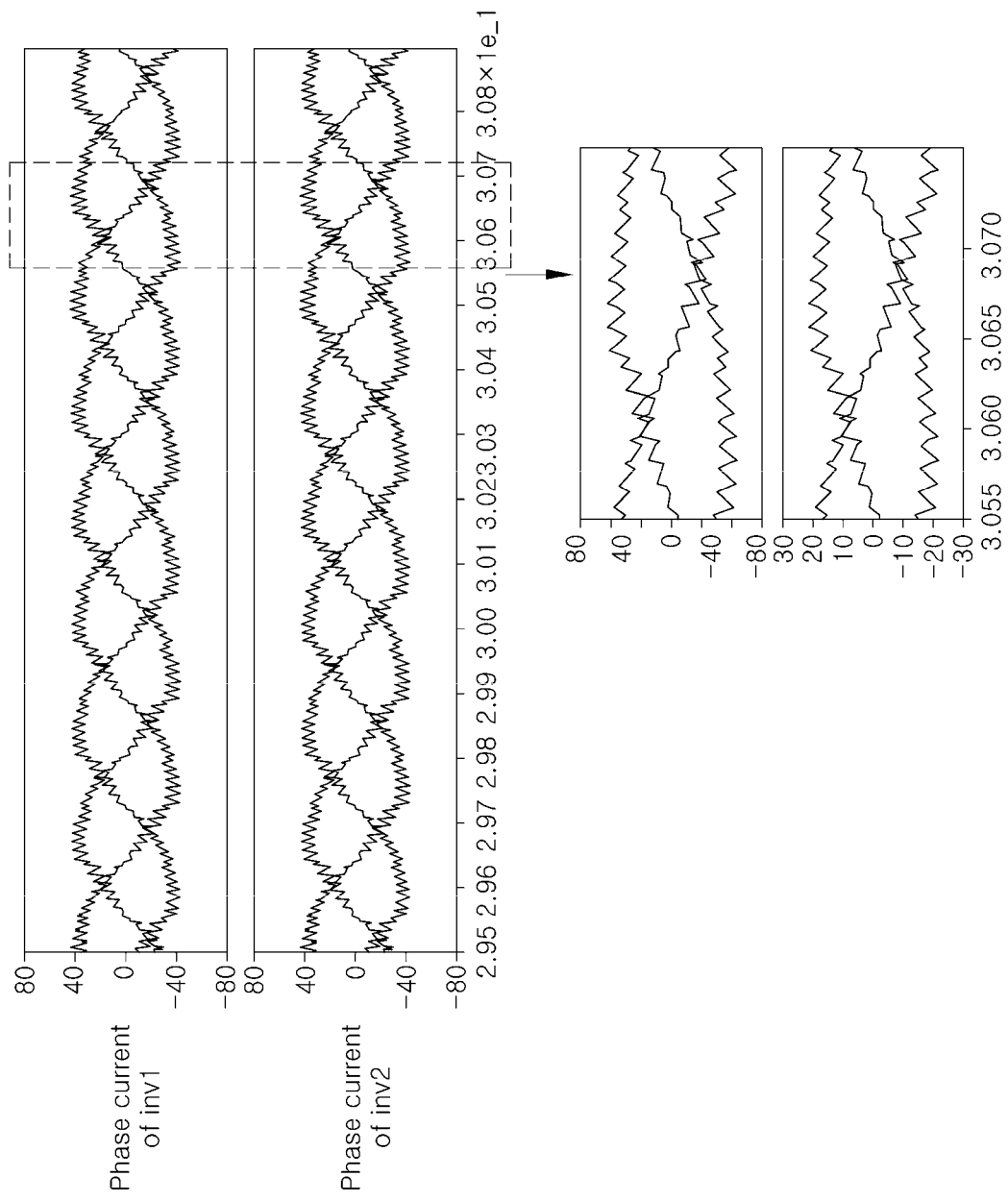

FIG. 5 and FIG. 6 are graphs illustrating an inverter phase current in the case of performing the space vector pulse width modulation by use of switching vectors having common mode voltage difference and an inverter phase current in the case of performing the space vector pulse width modulation by use of switching vectors from which the common mode voltage difference is removed, respectively.

As illustrated in FIG. 5, in the case of driving the motor in the space vector pulse width modulation method by use of switching vectors having the common mode voltage difference, it can be seen that a circulating current due to the common mode voltage difference is introduced and the distortion of the phase current is severe. Accordingly, it can be expected that the control of a motor current is difficult and the loss of the motor increases.

On the other hand, as illustrated in FIG. 6, in the case of driving the motor in the space vector pulse width modulation method by use of switching vectors which do not cause the common mode voltage difference, it can be seen that the distortion of phase current due to the introduction of a circulating current caused by the common mode voltage difference decreases. Accordingly, the control of a motor current is easy and the loss of the motor decreases.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus configured to drive a motor including a plurality of windings respectively corresponding to a plurality of phases, the apparatus comprising:
    a first inverter including a plurality of first switching elements and connected to a first end of each of the windings;
    a second inverter including a plurality of second switching elements and connected to a second end of each of the windings; and
    a controller configured to obtain a voltage command vector, which is a vector corresponding to a voltage command of the motor, by combining switching vectors which cause difference between a common mode voltage of the first inverter and a common mode voltage of the second inverter to be zero and configured to control the plurality of first switching elements and the plurality of second switching elements in a pulse width modulation method based on the obtained voltage command vector,
    wherein the switching vectors include a total of 64 switching vectors by combining eight voltage vectors which are combined by the first inverter and eight voltage vectors which are combined by the second inverter, and
    wherein the switching vectors which cause the common mode voltage difference to be zero of the 64 switching vectors include:
    a switching vector in which a switching state of the first inverter is [100] and a switching state of the second inverter is [010];
    a switching vector in which the switching state of the first inverter is [100] and the switching state of the second inverter is [001];
    a switching vector in which the switching state of the first inverter is [110] and the switching state of the second inverter is [011];
    a switching vector in which the switching state of the first inverter is [110] and the switching state of the second inverter is [101];
    a switching vector in which the switching state of the first inverter is [010] and the switching state of the second inverter is [001];
    a switching vector in which the switching state of the first inverter is [010] and the switching state of the second inverter is [100];
    a switching vector in which the switching state of the first inverter is [011] and the switching state of the second inverter is [101];
    a switching vector in which the switching state of the first inverter is [011] and the switching state of the second inverter is [110];
    a switching vector in which the switching state of the first inverter is [001] and the switching state of the second inverter is [100];
    a switching vector in which the switching state of the first inverter is [001] and the switching state of the second inverter is [010];
    a switching vector in which the switching state of the first inverter is [101] and the switching state of the second inverter is [110]; and
    a switching vector in which the switching state of the first inverter is [101] and the switching state of the second inverter is [011],
    wherein first, second, third digits of numbers indicating the switching states indicate the switching states of the switching elements in phases a, b, and c, respectively, in each of the first inverter and the second inverter, and a number "1" indicates that an upper switching element of an associated phase is turned on and a lower switching element thereof is turned off, and a number "0" indicates that the upper switching element of the associated phase is turned off and the lower switching element thereof is turned on.

2. The apparatus of claim 1,
    wherein when obtaining the voltage command vector, the controller does not use a switching vector in which a switching state of the first inverter is [100] and a switching state of the second inverter is [011], a switching vector in which the switching state of the first inverter is and the switching state of the second inverter is [001], a switching vector in which the switching state of the first inverter is [010] and the switching state of the second inverter is [101], a switching vector in which the switching state of the first inverter is [001] and the switching state of the second inverter is [100], and a switching vector in which the switching state of the first inverter is [001] and the switching state of the second inverter is [110], and
    wherein first, second, third digits of numbers indicating the switching states indicate the switching states of the switching elements in phases a, b, and c, respectively, in each of the first inverter and the second inverter, and a number "1" indicates that an upper switching element of an associated phase is turned on and a lower switching element thereof is turned off, and a number "0" indicates that the upper switching element of the associated phase is turned off and the lower switching element thereof is turned on.

3. The apparatus of claim 1, wherein the controller is configured to obtain the voltage command vector by combining two switching vectors adjacent to the voltage command vector of the motor among the switching vectors which cause the common mode voltage difference to be zero.

4. The apparatus of claim 3, wherein the controller is configured to express the voltage command vector as a sum of values obtained by the two switching vectors adjacent to the voltage command vector of the motor multiplied by predetermined coefficients, respectively, and determines a duty of space vector pulse width modulation based on the coefficients.

* * * * *